United States Patent [19]

Bergles

[11] 4,063,469

[45] Dec. 20, 1977

[54] MULTIPLE SPEED HUB FOR A VEHICLE WHEEL

[75] Inventor: Eduard Bergles, Graz, Austria

[73] Assignee: Fichtel & Sachs AG, Schweinfurt am Main, Germany

[21] Appl. No.: 706,060

[22] Filed: July 16, 1976

[30] Foreign Application Priority Data

July 25, 1975 Germany .............................. 2533308

[51] Int. Cl.² ...................... F16H 57/10; F16D 67/00
[52] U.S. Cl. .................................. 74/781 B; 192/6 A
[58] Field of Search .......................... 74/781 B, 750 B; 192/6 A

[56] References Cited

U.S. PATENT DOCUMENTS

| | | | |
|---|---|---|---|
| 2,895,576 | 7/1959 | Schwerdhofer | 74/781 B X |
| 3,102,436 | 9/1963 | Schuller | 74/750 B |
| 3,809,195 | 5/1974 | Schulz et al. | 74/750 B X |
| 3,828,627 | 8/1974 | Schwerdhofer | 74/750 B |
| 3,937,309 | 2/1976 | Schulz et al. | 74/750 B X |

FOREIGN PATENT DOCUMENTS 1,327,321   4/1963   France ................. 74/781 B

*Primary Examiner*—Benjamin W. Wyche
*Assistant Examiner*—Lance W. Chandler
*Attorney, Agent, or Firm*—Hans Berman

[57] ABSTRACT

In a multiple-speed hub for a bicycle or like vehicle, a driver is rotatably mounted on a shaft normally fixed on the bicycle frame. A hub shell whose axial ends are rotatably supported by the driver and the shaft respectively encloses a planetary gear transmission including a sun gear fixed on the shaft, an internally toothed ring gear and a planet carrier rotatable about the shaft axis, and a planet gear mounted on the carrier in simultaneous meshing engagement with the ring gear and sun gear. Two overrunning clutches are drivingly interposed between the ring and planet carrier respectively and the hub shell. A coupling member permanently rotating with the driver may be shifted between positions of torque transmitting engagement with the ring gear and the planet carrier by a manually operated slide partly received in a slot of the shaft and connected to the coupling member by springs which permit movement of the coupling member by cam faces on the planet carrier out of an accidental intermediate position of simultaneous torque transmitting engagement of the coupling member with the ring gear and planet carrier without simultaneous movement of the manually operated elements.

6 Claims, 6 Drawing Figures

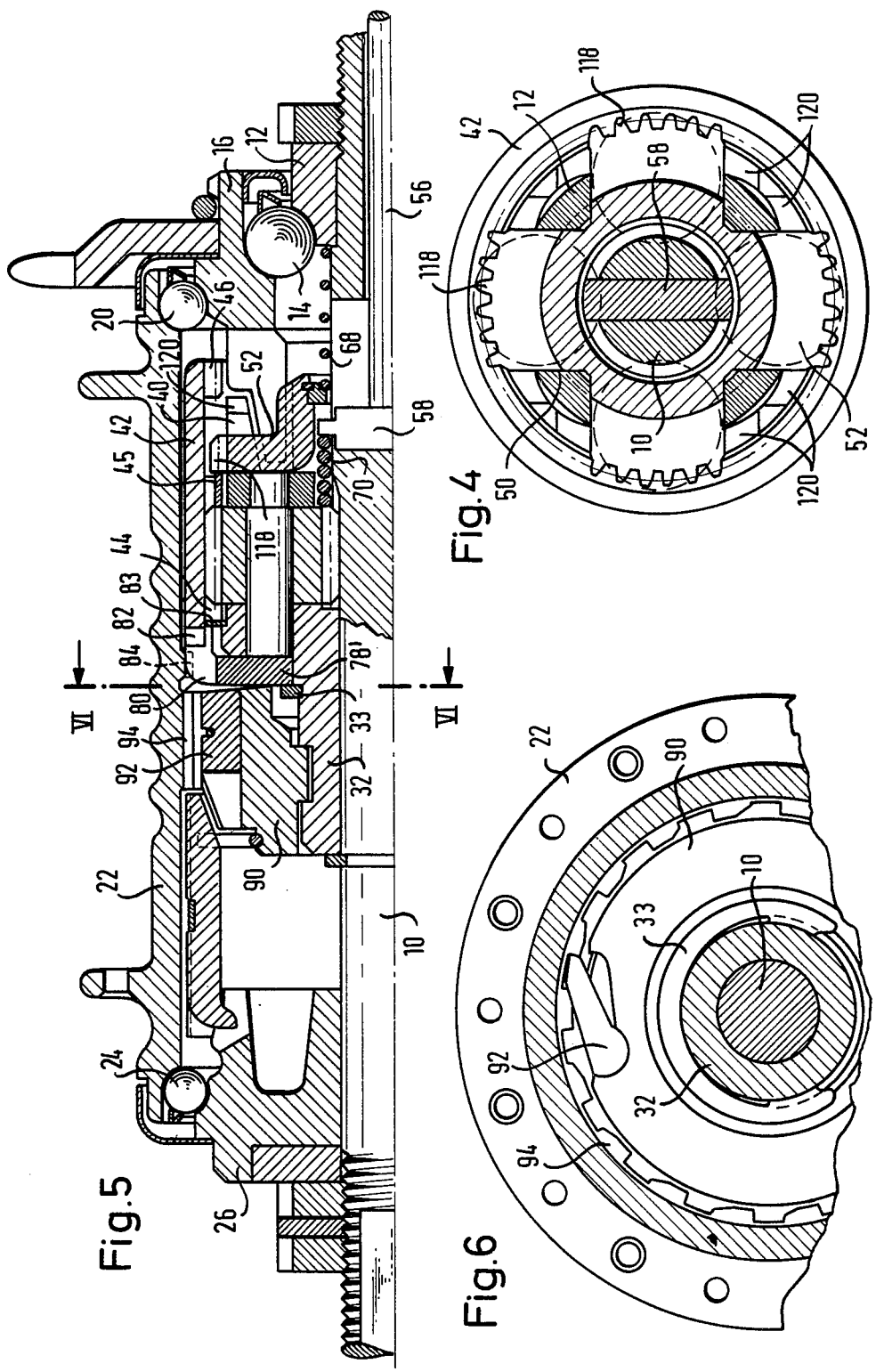

MULTIPLE SPEED HUB FOR A VEHICLE WHEEL

This invention relates to multiple-speed hubs suitable for use in the driven wheels of bicycles and like vehicles, and particularly to an improvement in the hub disclosed in the commonly owned U.S. Pat. No. 3,937,309.

The earlier hub includes a shaft, normally fixedly fastened to the frame of a bicycle or corresponding part of another vehicle, a driver provided with a chain sprocket, and a hub shell whose axial ends are rotatably supported on the driver and the shaft respectively and which encloses a planetary gear transmission having a sun gear fixed on the shaft, a ring gear and a planet carrier rotatable about the shaft axis and carrying planet gears simultaneously meshing with the ring gear and sun gear. An axially movable coupling member permanently rotates with the driver and may be shifted between positions of torque transmitting engagement with the ring gear and the planet carrier. Overrunning clutches are interposed between the ring gear and the planet carrier respectively and the hub shell.

The shifting mechanism for the coupling member is manually operated by means of a mechanism partly received in an axial bore of the shaft. Axially spaced portions of the coupling member are engaged by respective engagement devices on the ring gear and the planet gear in the two axially terminal positions of the shifting mechanism, and the necessary stroke of the shifting mechanism is shorter than the axial dimension of the coupling member as measured over the afore-mentioned axially spaced portions. To avoid damage to the hub by simultaneous torque transmitting engagement of the coupling member with the ring gear and the planet carrier in an intermediate axial position of the coupling member, means are provided for shifting the coupling member automatically out of the intermediate position into one of the terminal positions if the driver is turned.

In the known arrangement, elements of the operating mechanism move with the coupling member during the afore-described automatic movement of the latter. If a part of the operating mechanism is held in a fixed position, as by a lever equipped with click stops, when not being moved by the operator, damage to the operating mechanism may be caused by the afore-described automatic movement.

It is a primary object of this invention to avoid the possibility of such damage.

According to one of the basic features of this invention, the coupling member is connected to the manual operating mechanism by yieldably resilient means providing the necessary mobility of the coupling member out of a potentially harmful intermediate position without simultaneous movement of the operating mechanism.

Other features, additional objects, and many of the attendant advantages of this invention will readily be appreciated as the same becomes better understood by reference to the following detailed description of preferred embodiments when considered in connection with the appended drawing in which:

FIG. 4 is a radially sectional view of the same hub taken on the line IV—IV in FIG. 1;

FIG. 5 shows a modified embodiment of the invention in a view corresponding to that of FIG. 1; and FIG. 6 illustrates the hub of FIG. 5 in partial section on the line VI—VI.

Figure 1:
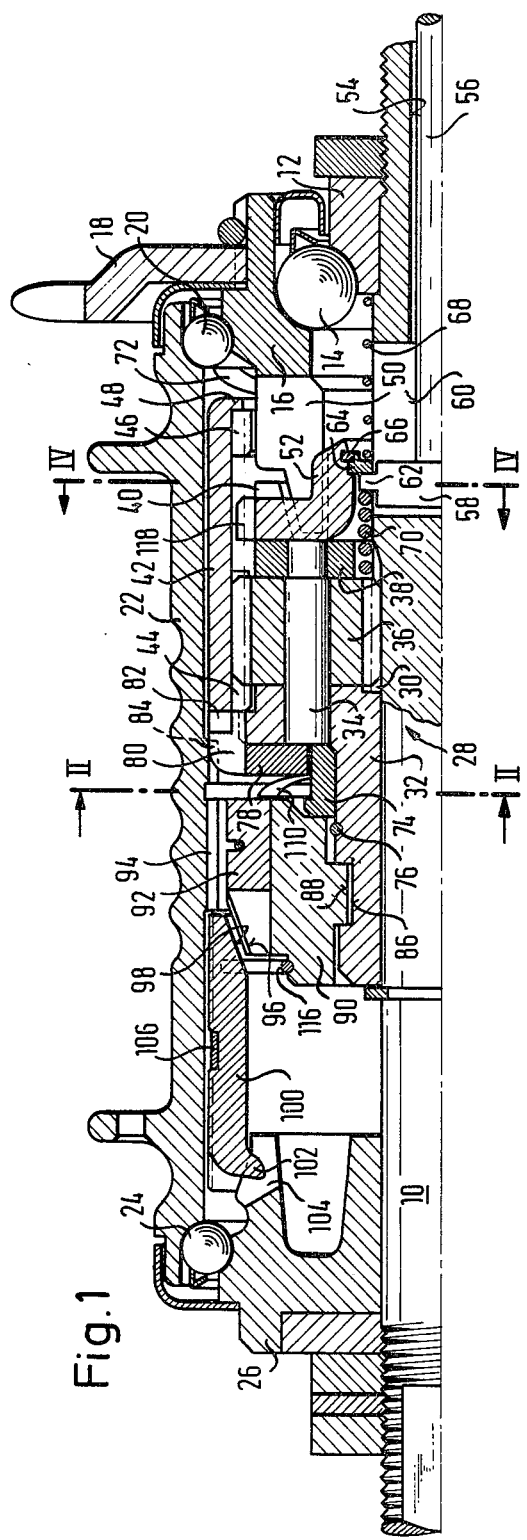
FIG. 1 shows one half of a bicycle hub of the invention in rear-elevational section on its axis, the non-illustrated half being a mirror image of the device shown in FIG. 1.

Referring initially to FIG. 1, there is seen a three-speed bicycle hub of the invention whose movable elements are mounted on a normally fixed shaft 10. An inner bearing ring 12 and a first set 14 of bearing balls support a tubular driver 16 for rotation about the shaft axis. A chain sprocket 18 is fixedly attached to the driver 16. Another set 20 of bearing balls on the driver 16 supports one axial end of a hub shell 22 whose other end is rotatably mounted on the shaft 10 by means of a third set 24 of bearing balls and an axially adjustable, inner bearing ring 26.

The hub shell 22 encloses a planetary gear transmission 28 including a sun gear 30 integrally fixed on the shaft 10 and a planet carrier 32. Four planet shafts 34 equiangularly distributed on the planet carrier 32 carry respective planet gears 36, only one shaft 34 and one gear 36 being visible in FIG. 1. The free ends of the shafts 34 are connected by a ring 38 from which engagement claws 40 project axially toward the driver 12. The planet gears 36 simultaneously mesh with the sun gear 30 and internal teeth 44 on a ring gear 42. The axial portion of the ring gear 42 near the driver 12 carries coupling teeth or ribs 46 and an internal, radial flange 48 projecting into the gaps between the teeth 46.

The driver 16 is slotted in two perpendicular, axial planes, and the four radial slots 50 receive respective arms of a coupling member 52 with sufficient clearance to permit axial movement of the coupling member relative to the driver during joint rotary movement about the shaft 10. In the position of the hub shown in FIG. 1, the claws 40 on the planet carrier 32 are received between the arms of the coupling member 52 so that the planet carrier rotates with the driver 16.

The coupling member 52 may be shifted manually into and out of the axially terminal position shown in FIG. 1 by a conventional operating mechanism only partly shown in the drawing. An axial bore 54 in the shaft 10 slidably receives a cylindrical rod 56. The non-illustrated end of the rod outside the shaft 10 is normally connected to a lever on the handlebar of the bicycle by a chain and a Bowden cable, not shown. The inner end of the rod 56 abuts against a slide 58 axially guided in a radially open slot 60 of the shaft 10 which communicates with the bore 54. A small portion 62 of the slide 58 projects from the slots 60 and abuttingly engages a flat ring 64 fixedly secured on the central or hub portion of the coupling member 52 by a spring clip 66. A helical compression spring 68 is coiled about the shaft 10 and axially interposed between the inner bearing ring 12 and the flat ring 64. Another, much stronger, helical compression spring 70 is interposed between the projecting slide portion 62 and a portion of the carrier 32 not visible in the drawing.

An axially compressible, undulating, annular leaf spring 72 is arranged between the driver 16 and the ring gear 42 and biases the ring gear axially away from the driver. A spacer sleeve 74 is axially secured on the planet carrier 32 between a shoulder of the carrier and a spring clip 76 and rotatably carries a motion transmitting ring 78. As is better seen in FIGS. 2 and 3, equiangularly distributed teeth 80 project radially outward and then axially toward the driver 16 from the ring 78. Their free ends cammingly cooperate with saw teeth 82 axially projecting from an axial end face of the ring gear 42. The teeth 80 also are received between internal teeth or ribs 84 on the inner cylindrical surface of the hub shell 22.

The hub portion of the planet carrier 32 projecting beyond the sleeve 74 carries square threads 86 matingly engaged by corresponding threads 88 on a pawl carrier 90. Pawls 92 mounted on the carrier 90 in a conventional manner, illustrated in FIG. 6 with reference to the modified hub of FIG. 5, are biased by a common pawl spring toward engagement with ratchet teeth 94 on the inner face of the hub shell 22.

A brake cone 96 on the pawl carrier 90 faces a mating conical surface 98 on a split, expandable brake sleeve 100. Interdigitated projections 102, 104 on the sleeve 100 and the inner bearing ring 26 prevent rotation of the sleeve 100. An annular spring 106 normally compresses the sleeve 100 and holds it out of contact with the hub shell 22. When the pawl carrier 90 moves toward the bearing ring 26, the sleeve 100 is expanded, engages the hub shell 22, and thereby frictionally couples the hub shell 22 to the stationary shaft 10.

A leaf spring 110 of undulating, annular shape is interposed axially between the pawl carrier 90 and the motion transmitting ring 78. The springs 72, 110 thus jointly bias the teeth 82, 84 toward the engaged position illustrated in FIG. 3.

As far as described so far, the illustrated hub operates as follows:

When the driver 16 is turned by the sprocket 18 during forward pedaling by the bicycle operator, torque is transmitted by the coupling member 52 and the claws 40 to the planet carrier 32. The planet gears 36 drive the ring gear 42 at an angular speed higher than that of the driver 16. The steep flanks 112 of the saw teeth 82 drive the teeth 80 of the motion transmitting ring 78 which in turn rotate the hub shell 22.

When pedaling is interrupted while the wheel rolls, the teeth or ribs 84 on the hub shell 22 turn the ring 78. However, the teeth 80 move over the gently sloping flanks 114 of the saw teeth 82 without turning the ring gear 42 which moves axially toward the driver 16 against the relatively weak restraint of the spring 72. The teeth 80, 82, 84 thus cooperate as an overrunning clutch drivingly interposed between the ring gear 14 and the hub shell 22.

Another overrunning clutch connecting the plant carrier 32 to the hub shell 22 is provided by the pawls 92 and the cooperating ratchet teeth 94. During pedaling and during freewheeling in the hub condition illustrated in FIG. 1, the hub shell 22 turns faster than the pawls 92 which slide idly over the ratchet teeth 94.

The hub may be braked by back-pedaling. When the planet carrier 32 is rotated backward by the driver 16 and the coupling member 52, a wire spring 116 attached to the brake sleeve 100 and frictionally engaging the pawl carrier 90 causes the latter to move threadedly on the planet carrier 32 away from its illustrated, terminal position of abutting engagement with the spacer sleeve 74 which is maintained by the spring 116 during forward pedaling and during freewheeling. The cone 96 engages the face 98 of the sleeve 100 until the sleeve couples the hub shell 22 to the stationary shaft 10.

When the rod 56 is withdrawn by the operator outward of the bore 54, the spring 70 shifts the coupling member 52 axially toward the driver 16. The radially outer faces of the four arms on the coupling member carry driving teeth or ribs 118 which are moved into the gaps between the teeth or ribs 46 on the ring gear 42 whose axial position remains unchanged except as needed to avoid clashing of the teeth 118, 46. As soon as the teeth are properly engaged, the springs 72, 110 restore the illustrated position of the ring gear. The ring gear 42 and the motion transmitting ring 78 turn at the speed of the driver 16, and the hub shell 22 is driven at the same speed.

When pedaling stops while the wheel rolls, the teeth 80 move over the flanks 114 of the teeth 82 as described above, the spring 72 being alternatingly compressed and permitted to expand. The ratchet teeth 84 overtravel the pawls 92. During back-pedaling, torque is transmitted from the ring gear 42 to the planet carrier 32 by the planet gears 36, and the resulting expansion of the brake sleeve 100 causes braking of the hub shell 22.

When the rod 56 is withdrawn further than is needed to engage the driving teeth 118 of the coupling member 52 fully with the cooperating engagement teeth 46 of the ring gear 42 while disengaging the claws 40 from the arms of the coupling member 52, the arms of the latter engage the flange 48, and the ring gear 42 is moved toward the driver 16 against the restraint of the spring 72 until the saw teeth 82 of the ring gear 42 are out of range of the teeth 80 on the ring 78, axial movement of the ring 78 under the biasing force of the spring 110 being limited by a radial face of the planet carrier 32.

Torque is transmitted from the driver 16 by the coupling member 52 to the ring gear 42, thence by the planet gears 36 to the planet carrier 32. The hub shell 22 is driven at the lower speed of the planet carrier by the pawls 92. During freewheeling, the ratchet teeth 94 overtravel the pawls 92, and the brake operates as described above when the driver 16 is turned backward.

Figure 3:
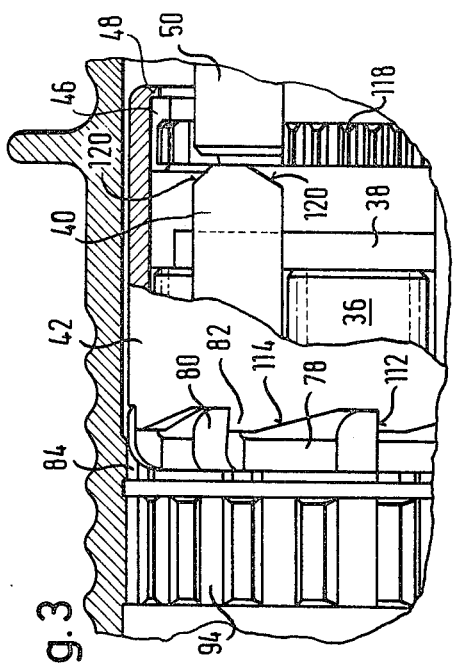
FIG. 3 shows a portion of the hub of FIG. 1 in rear elevation, the hub shell and other elements being partly broken away.

As is best seen in FIG. 3, the claws 40 have beveled cam faces 120 obliquely inclined to the hub axis. If for any reason the rod 56 moves the coupling member 52 into an intermediate position in which the teeth 46, 118 are engaged, but the claws 40 are not fully withdrawn from between the arms of the coupling member 52, the arms are circumferentially aligned with cam faces 120 regardless of the direction of driver rotation. Because of the different angular speed of the ring gear 42 and the planet carrier 32, the coupling member 52 is cammingly shifted away from the planet carrier 32 before clashing of transmission elements can cause any damage. Such automatic movement of the coupling member 52 is not impeded if the rod 56 is held in a fixed position by a click stop on the non-illustrated operating lever or the like. The relatively weak spring 68 yields to permit movement of the flat ring 64 away from the projecting part 62 of the slide 60.

In some hubs equipped with coaster brakes of the general type described with reference to FIG. 1, the driven wheel may be blocked when braked to a standstill from the condition shown in FIG. 1 if the operator thereafter dismounts and pushes the bicycle rearward. The hub shell 22 turns the ring 78 backward. If this motion were transmitted to the ring gear 42, it would further cause backward rotation of the planet carrier 32 and engagement of the hub shell 22 by the sleeve 100. If the brake was applied before, it would be applied more strongly, and the wheel would be blocked.

Figure 2:
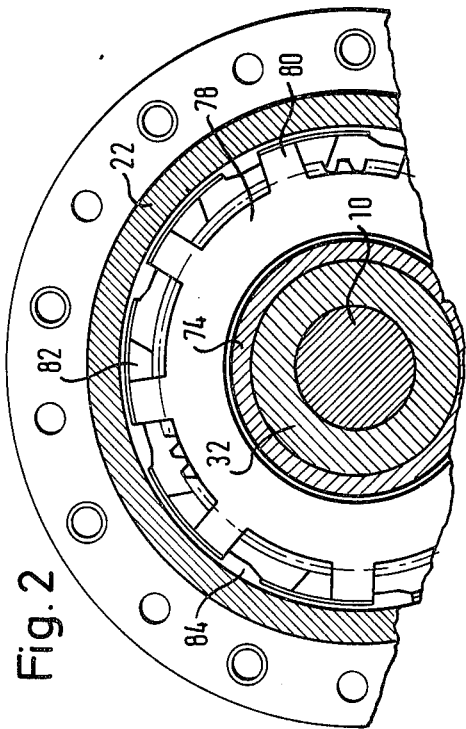
FIG. 2 illustrates the hub of FIG. 1 in fragmentary section on the line II—II.

In the hub of the invention, the angular spacing of the teeth or ribs 84 on the inner face of the hub shell 22 is substantially greater than the corresponding spacing of the ratchet teeth 94, as is evident from joint consideration of FIGS. 2 and 3. Because the teeth 80 engage the teeth 84 with relatively great friction, the clearance between the teeth 80, 82 is consumed before the teeth 80 can slide over the teeth 82 during back-pedaling and braking. If, thereafter, the bicycle is pushed rearward, the teeth 80 must move over the entire flanks 114 before the ring 78 can turn the ring gear 42 backward. Because of the smaller spacing of the ratchet teeth 94, the pawls 92 are turned backward and safely disengage the brake before it can again be engaged.

The embodiment of the invention illustrated in FIGS. 5 and 6 differs from the afore-described hub mainly in the overrunning clutch associated with the planet carrier 32. Other differences are limited to minor dimensional variations, and the same reference numerals have been employed to designate elements functionally and structurally equivalent to those described with reference to FIGS. 1 to 4, and not again described with reference to FIGS. 5 and 6.

The motion transmitting ring 78' whose teeth 80 cooperate with saw teeth 82 on the ring gear 42 and coupling teeth 84 on the hub shell 22 rotatably engages the outer cylindrical face of the planet carrier 32 and is axially secured between a radial face of the planet carrier 32 and a spring clip 33 partly recessed in the shaft 10. Instead of the springs 72, 110 which normally maintain engagement between the teeth 80, 82 in the first-described hub of the invention, the modified hub employs a leaf spring 83 of annular, undulating shape axially interposed between radial end faces of the internal gear teeth 44 on the ring gear 42 and of the teeth 80 on the ring 78'. The spring 83 tends to disengage the teeth 80, 82.

A tubular spacer 45 is interposed between the other radial end faces of the gear teeth 44 and the arms of the coupling member 52 so that the biasing force of the spring 68, greater than that of the spring 83, is transmitted to the ring gear 42 to keep the teeth 80, 82 normally engaged.

The structural modifications do not significantly affect the operation of the hub shown in FIGS. 5 and 6 which will be obvious from the description of the hub of FIGS. 1 to 4.

It should be understood, of course, that the foregoing disclosure relates only to preferred embodiments of the invention, and that it is intended to cover all changes and variations of the examples chosen for the purpose of the disclosure which do not constitute departures from the spirit and scope of the appended claims.

The operation of the hub of FIG. 5 is as follows: In the position of FIG. 5 the torque is transmitted from the driver 16 by the coupling member 52 and the claws 40 onto the planet carrier 32. The ring gear rotates with an increased number of revolutions as compared with the driver 16. This increased number of revolutions of the ring gear 42 is transmitted by the interengaging saw teeth 82 and teeth 80 to the ring 78' and from the ring 78' by the interengaging teeth 80 and internal teeth 84 onto the hub shell 22. The hub shell therefore rotates with the increased number of revolutions, i.e. with the fast speed.

When the coupling member 52 is moved to the right until the beginning of the beveled cam faces, the hub is switched to the next speed, the normal speed. In this condition the ring gear 42 is moved to the right by the action of the spring 83, so that the teeth 82 come out of engagement with the teeth 80. Now the torque is again transmitted from the driver 16 by the coupling member 52 and the longer claws 40 to the planet carrier 32. From the planet carrier 32 the torque is transmitted by the carrier 90 and the pawls 92 to the ratchet teeth 94, so that the hub shell 22 is driven with the same speed as the driver 16.

When the coupling member 52 is moved further to the right, so that it comes out of engagement with the claws 40 and the teeth 40 come into engagement with the teeth 46 the hub is in the condition of the low speed. Now the torque is transmitted from the driver 16 by the coupling member 52 to the ring gear 42. The ring gear, which rotates with the same speed as the driver 16 transmits to the planet carrier 32 a reduced speed. This reduced speed is transmitted from the planet carrier 32 by the carrier 90 and the pawls 92 to the hub shell 22.

It should be noted that the flansh 48 as illustrated in FIG. 1 is not necessary in the construction of FIG. 5.

What is claimed is:

1. A multiple speed hub for a bicycle and like vehicle comprising:
   a. a shaft having an axis;
   b. a driver member rotatable on said shaft about said axis;
   c. a hub shell having two axial end portions rotatably mounted on said driver member and said shaft respectively;
   d. a planetary gear transmission in said hub shell including a sun gear fixedly secured to said shaft, an internally toothed ring gear and a planet carrier rotatable about said axis, a planet gear rotatable on said carrier in simultaneous meshing engagement with said ring gear and said sun gear;
   e. first overrunning clutch means drivingly interposed between said ring gear and said hub shell;
   f. second overrunning clutch means drivingly interposed between said planet carrier and said hub shell;
   g. a coupling member permanently connected to said drive member for joint rotation about said axis and including first and second driving portions;
   h. first and second axially offset engagement means on said ring gear and said planet carrier respectively;
   i. shifting means for axially shifting said coupling member between a first position of torque transmitting engagement of said first driving portion with said first engagement means and a second position of torque transmitting engagement of said second driving portion with said second engagement means,
      1. said shifting means including a slide member mounted on said shaft, manual operating means for axially moving said slide member relative to said shaft, and yieldably resilient connecting means operatively interposed between said slide member and said coupling member and biasing said coupling member to move axially with said slide member,
      2. the axial spacing of said first and second engagement means being smaller than the axial dimension of said coupling member measured over said driving portions, 3. one of said engagment means including an engagement member projecting axially from said planet carrier toward said coupling member,
4. said engagement member having a cam face obliquely inclined relative to said axis and cammingly cooperating with said second driving portion of said coupling member in said intermediate position of the coupling member for shifting said coupling member toward the other engagement means against the restraint of said connecting means in an intermediate position of simultaneous torque transmitting engagement of said coupling member with said first and second engagement means.

2. A hub as set forth in claim 1, wherein said shaft is formed with an axial bore and a radially open, axially elongated slot communicating with said bore, said operating means including a rod member axially movable in said bore, said slide member being secured to said rod member for joint axial movement and radially projecting from said slot, and said connecting means including a spring biasing said coupling member toward motion transmitting engagement with said slide member.

3. A hub as set forth in claim 1, wherein said first clutch means include a plurality of circumferentially distributed saw teeth axially projecting from said ring gear, an annular motion transmitting member rotatable about said axis and carrying projections axially directed toward said saw teeth for driving engagement thereby, and means securing said motion transmitting member to said hub shell for joint rotation about said axis.

4. A hub as set forth in claim 3, further comprising means responsive to said shifting of said coupling member between said first and second positions of the coupling member for axially engaging and disengaging said projections and said saw teeth.

5. A hub as set forth in claim 4, wherein said second clutch means include a pawl carrier drivingly connected to said planet carrier, a pawl member on said pawl carrier, and a plurality of ratchet teeth circumferentially distributed on said hub shell for engagement by said pawl member, the angular spacing of said saw teeth relative to said axis being greater than the angular spacing of said ratchet teeth.

6. A hub as set forth in claim 5, further comprising matingly engaged threads on said pawl carrier and on said planet carrier, means for limiting threaded movement of said pawl carrier on said planet carrier in one axial direction, and brake means responsive to threaded movement of said pawl carrier on said planet carrier in the other axial direction for frictionally coupling said hub shell to said shaft.

* * * * *